April 19, 1938.　　　H. F. GUNDLACH　　　2,114,299
SURFACE DECORATING MECHANISM
Filed Nov. 30, 1936　　　2 Sheets-Sheet 1
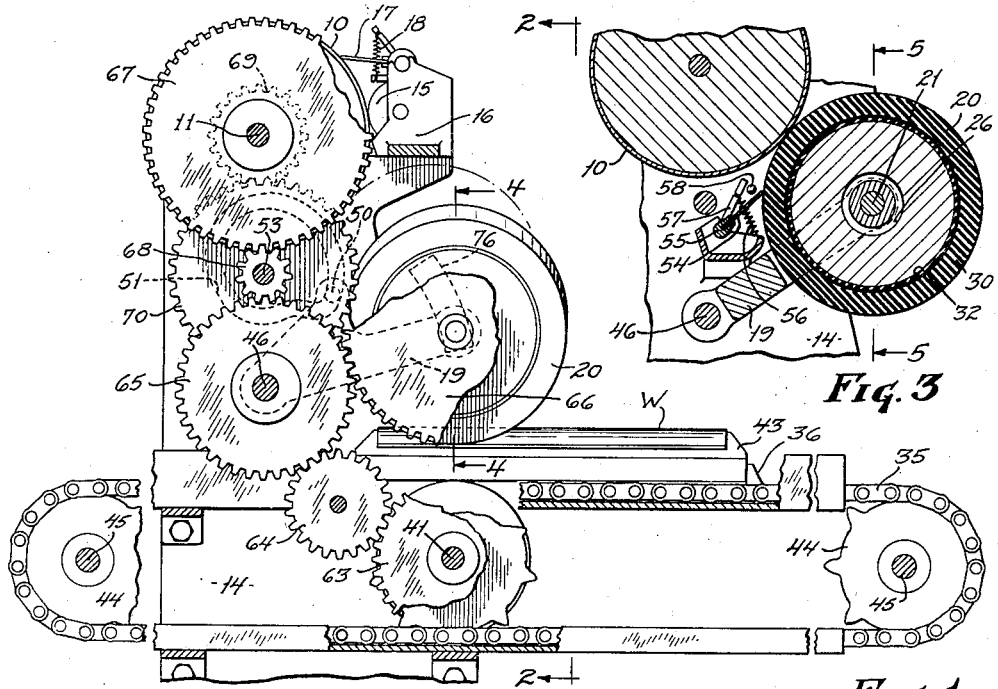
Fig. 3
Fig. 1
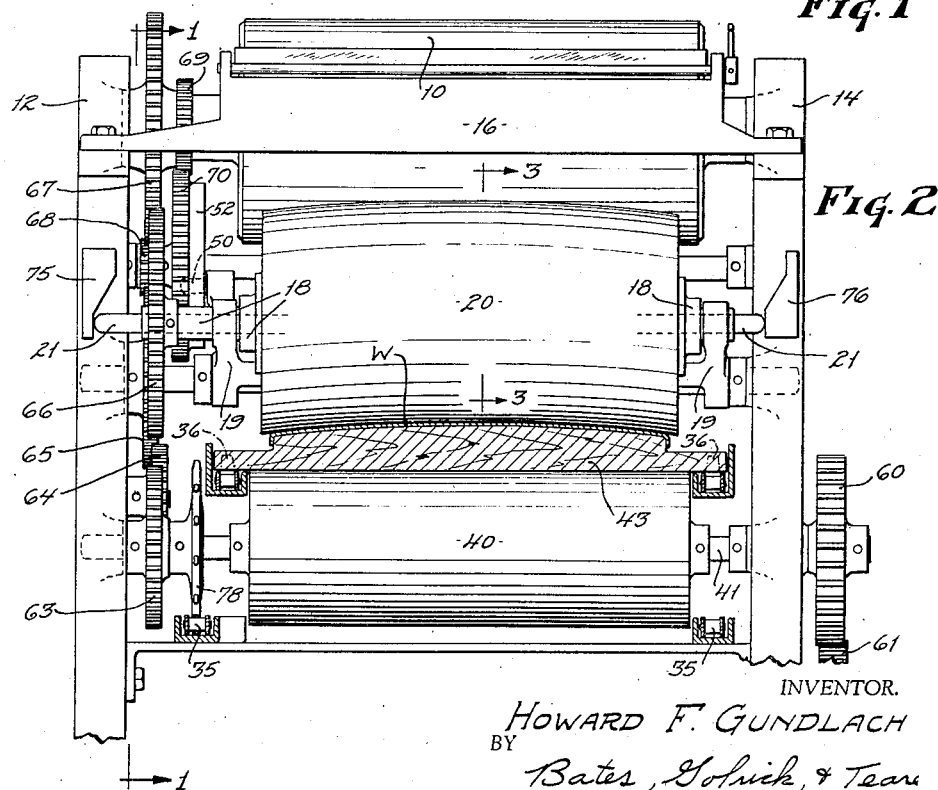
Fig. 2
INVENTOR.
HOWARD F. GUNDLACH
BY Bates, Golrick, & Teare
ATTORNEYS Patented Apr. 19, 1938

2,114,299

UNITED STATES PATENT OFFICE 2,114,299

SURFACE DECORATING MECHANISM

Howard F. Gundlach, Cleveland, Ohio, assignor to Oxford Varnish Corporation, Detroit, Mich., a corporation of Michigan Application November 30, 1936, Serial No. 113,406

5 Claims. (Cl. 101—154)

This invention relates to a surface-decorating machine, and especially to an improved machine for transferring a pattern to workpieces which may vary in surface contours. This, therefore, is the general object of the present invention.

Another object of this invention is to provide a work-decorating mechanism with a transfer member which will cooperate equally as effectively with a pattern surface as with a workpiece having a surface contour differing from the surface contour of the pattern, to thereby accurately transfer a design from the pattern to the work.

A more specific object of the present invention is to provide a rotary decorating machine with a transfer roll, the surface contour of which may vary to coact with a pattern in a relatively straight-line relationship, or with a workpiece in a line contact relationship other than a straight line, together with a mechanism to cause such roll to contact with the pattern in the straight-line relationship, heretofore mentioned.

A further object is to provide a deformable transfer roll, which may be brought into contact alternately with a flat surface, and an uneven surface, and substantially the same contact pressure maintained over all portions of either surface with which the roll is contacting.

Other objects and features of the present invention will become apparent from the following description relating to the accompanying drawings, showing an illustrative form of apparatus for utilizing the invention. The essential characteristics of the invention will be set forth in the claims.

Figure 4:
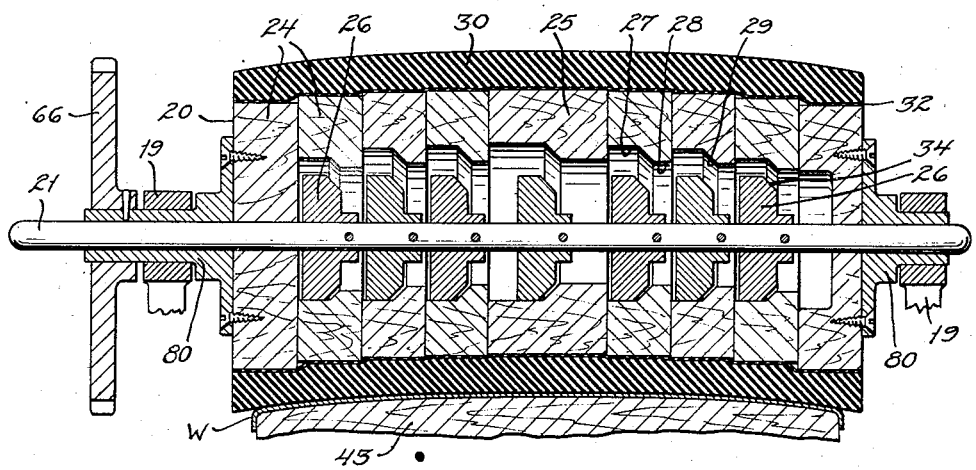
Figure 5:
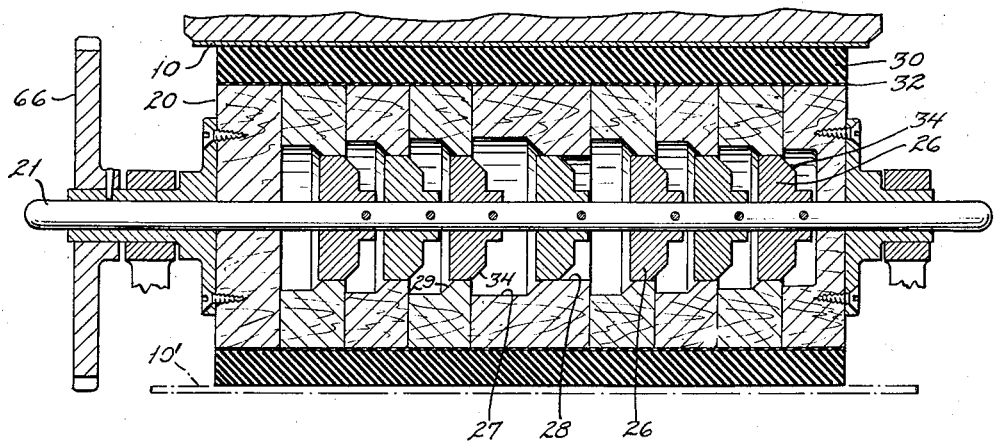

Fig. 1 is a vertical section, taken through a decorating machine embodying my invention, the plane of the section being indicated by the lines 1—1 on Fig. 2; Fig. 2 is a transverse sectional view, as indicated by the lines 2—2 of Fig. 1; Fig. 3 is a fragmentary section, the plane of the section being indicated by the line 3—3 on Fig. 2; Figs. 4 and 5 are vertical sections through the transfer member, as indicated by the lines 4—4 and 5—5 on Figs. 1 and 3, respectively.

Referring in detail to the drawings, it will be seen that I have illustrated the invention in connection with a machine having a cylindrical pattern roll 10. This roll is supported by a shaft 11, journalled in end frame members 12 and 14, which are connected by suitable cross-frame members. The pattern is supplied with color by an inking roll 15, rotatively mounted in the frame and having its lower region submerged in fluid color carried by a reservoir or trough 16. Preferably the pattern is of the type where the ink is retained thereon by ink-receiving pockets. The surplus ink or color is removed by a scraper or doctor blade 17, which is maintained in contact with the pattern by a spring 18.

The color remaining on the pattern after the doctor blade 17 has removed the surplus therefrom, is transferred to an offset printing roll 20. As illustrated, this roll is supported on a shaft 21 by a pair of end plates 80, which are secured to opposite ends of the roll and are rotatably mounted in the arms of a yoke or bracket 19, hereinafter to be more fully described. The end plates are maintained in alignment with each other by the shaft 21, which passes through the roll from one end to the other.

The roll 20 has a core comprising a plurality of relatively circular rings or sections, there being comparatively thin rings, as indicated at 24 near the end portions of the roll, and a thicker ring 25 at the longitudinal center of the roll. These rings 24 and 25 are provided with central openings, which are larger than the effective shaft 21, so that all sections may shift radially relative to the shaft, as well as to each other, bringing the roll into and out of cylindrical arrangement. The effective shaft surface adjacent the sections comprises, as shown, discs 26, all of which are secured rigidly to the shaft 21, as by pins. The discs 26 are spaced from each other and each disc is arranged to coact with the internal surfaces of respective rings to deform the roll and cause its periphery to conform substantially with the contour of the work with which the roll is to be used.

Embracing and peripherally enveloping all of the discs, there is shown a cylindrical hollow body of material adapted to effect a transfer of the decorative medium from the pattern roll to the work. This transfer material is shown as one continuous piece 30, and may comprise the usual glue and glycerin compound, which, in the past, has been found suitable for transferring a design from the pattern to the work. Intermediate this transfer material and the discs is a tubular member or sleeve of pre-stretched, live, elastic rubber 32, which bridges and substantially envelopes all of the sections of the roll. Preferably this sleeve of rubber is individually attached to the peripheral surfaces of the respective discs, as explained in detail in the copending application of Edward Wm. Hamant, Serial No. 88,867, filed July 3, 1936, and assigned to my assignee, Oxford Varnish Corporation.

The roll of the present invention is provided with rings, the internal diameters of which vary in size, while the discs 26 all have the same external diameter. The effect, however, is substantially the same as that shown and described in the application above referred to, wherein the openings in the rings are of the same diameter and the diameters of the discs vary. In the roll of the present invention, however, each ring is provided with a pair of openings, one of which is the opening 27, having the larger diameter and heretofore described, and the other of which is the opening 28, having substantially the same diameter as its corresponding disc 26. These two openings are concentric with each other and are joined by an internally bevelled wall 29. These walls 29 cooperate with bevelled shoulders 34 of their respective discs 26, to cause the rings to be cammed into axial alignment with each other, and the shaft 21, consequent upon the movement of the shaft axially, from the position illustrated in Fig. 4 to the position illustrated in Fig. 5.

When the shaft is in the position illustrated in Fig. 5, each of the discs 26 cooperates with its ring opening 28 and maintains the rings in axial alignment with each other, thus maintaining the roll in a true cylindrical form.

When, however, the shaft 21 is moved to the position shown in Fig. 4, the discs 26 cooperate with the enlarged openings 27, permitting the rings to move, one relative to the other, and consequent upon pressure being applied to the shaft to bring the roll into contact with the work, such as that shown at W, in Fig. 4, each disc 26 cooperates with the surface of the enlarged opening 27 in its respective ring, applying the pressure of the roll to the work substantially even throughout the entire length of the roll, thus enabling the design to be removed from the pattern and applied to the work with substantially the same pressure throughout the contact area of the roll with either the pattern or the work, even though the surface contour of the pattern varies from the surface contour of the work.

The work is supported for cooperation with the transfer roll 20 by a supporting roll 40, which is mounted on a suitable shaft 41, journalled in the frame members 12 and 14, heretofore mentioned. The work is fed into the bite of the rolls 20 and 40 by chains 35, which are provided with lugs 36, arranged to engage a workholder 43 on which the work is accurately positioned by the operator. The chains 35 are each looped around a pair of sprockets 44, which are secured to suitable shafts 45, journalled in the frame members.

The arrangement of the mechanism is such that the offset or transfer roll 20 is alternately moved from contact with the pattern into contact with the work. The work feeding chains likewise are operated in timed relationship with the movement of the transfer roll, and present the work to the roll in such a manner as to insure the application of the same pattern to every piece of work.

As heretofore mentioned, the pattern roll is supported by the yoke 19. As illustrated in Figs. 1, 2, and 3, this yoke is pivotally mounted on a shaft 46, carried by the frame members 12 and 14. The yoke is provided with a roller 50, arranged to coact with a groove 51 in a cam disc 52, which is mounted on a shaft 53 carried by the frame. The arrangement is such that rotation of the cam causes the roll to be alternately moved from engagement with the pattern into engagement with the work.

As the roll 20 moves toward the pattern, it engages a doctor blade 54. This blade is secured to a support 55 which is pivotally mounted in the frame members, and is swung in a clockwise direction by a spring 56 interposed between the frame and a pin 57, carried by the support 55. A suitable pin 58, carried by the frame, limits the movement of the blade. When, however, the roll 20 moves upwardly (Fig. 3), it engages the blade 54, whereupon, due to the rotation of the roll, as will hereinafter be described, the blade removes any color remaining on the roll after the transfer of the design to the work. The relationship of the mechanism is such that the color is removed from the roll before the roll actually contacts the pattern.

As the roll moves upward toward the pattern roll the shaft 21 is moved to the right by a stationary cam 75 fixed to the frame member 12. The discs 26 on the shaft are thereby made to enter the openings 28 and, as heretofore described, maintains the roll in true cylindrical form. This form is obtained before engagement by the doctor blade and the pattern roll.

As the roll descends to meet the work, the shaft 21 is moved to the left by a cam 76 fixed to the frame member 14, bringing the discs 26 into the larger openings 27 and, as heretofore described, permitting the roll to conform to the contour of the work. The shaft is maintained in its right-hand and left-hand positions at the top and bottom of its travel by appropriate vertical lands on the cams 75 and 76.

As shown, the shaft 41 of the platen roll 40 is provided with gears 60, adapted to be driven by suitable power-operated means, such as, for instance, a motor-driven pinion 61. At the left-hand end of the shaft 41 there is secured a gear 63, which, through the medium of an idler gear 64, drives a gear rotatively carried by the shaft 46, heretofore mentioned, and about the axis of which the offset roll 20 rocks. Secured to the offset roll by a suitable pin as shown in Figs. 4 and 5, is a gear 66, arranged to constantly mesh with the gear 65, thereby driving the offset roll in timed relationship with the platen roll.

The pattern roll is also driven in timed relationship to the roll 40. As shown in Figs. 1 and 2, a gear 67 is secured to the pattern roll, and is driven by the gear 65 through the medium of an idler pinion 68, which is carried by the cam shaft 53, heretofore described. The cam is driven by the pattern roll through suitable reduction gearing. As shown a gear 69 is drivingly secured to the pattern roll 68 and meshes with a gear 70, secured to the cam 52.

The work feeding mechanism is likewise driven in timed relationship with the various rolls. As shown in Figs. 1 and 2, the shaft 41 is provided with a sprocket wheel 78, arranged to engage one of the work-progressing chains 35. This chain drives the other through the sprockets 44 and the shafts 45 heretofore described. Thus, it will be seen that the various rolls and mechanisms are each driven in timed relationship with each other.

While I have described my improved roll mechanism in connection with a machine adapted for substantially continuous or automatic operation, I nevertheless contemplate manually rolling the roll across a pattern and the work. In this instance the end plates 80, heretofore mentioned, will be provided with suitable handles, such as sleeves rotatably mounted on the axially extending portions of these plates, and which may be conveniently grasped by the operator. The plunger or rod 21 then will be moved manually to the extreme right-hand end, as shown on Fig. 5, and the roll rolled across a comparatively flat pattern member, indicated by the dotted lines 10' in Fig. 5. After the pattern has been completely transferred to the roll, the roll will be lifted out of contact with the pattern, the rod 21 moved to the extreme left-hand position, shown in Fig. 4, and the roll brought into rolling contact with the work W.

From the foregoing it will be seen my invention includes an improved transfer roll and operating mechanism therefor which may be utilized in a machine and actuated automatically, or which may be manually actuated and rolled across the pattern and the work.

I claim:

1. In a work decorating mechanism, a pattern, a work support, a deformable transfer roll, means to move the transfer roll alternately into contact with the pattern roll and into contact with work carried by said support, and means to restrain the roll against deformation when the roll is in contact with the pattern.

2. In a work decorating machine, a pattern roll, a work support, a deformable transfer roll, a doctor blade, means to move the transfer roll from contact with work carried by said support, into contact with said doctor blade and subsequently into contact with the pattern roll, and means to restrain the roll against deformation when the roll is in contact with the doctor blade.

3. In a decorating machine having a pattern and a work support, the combination of a transfer roll, means to shift the transfer roll alternately into contact with work carried by said support and into contact with the pattern, said transfer roll including a series of sections radially shiftable relative to each other, and means to automatically shift said sections consequent upon the shifting of the roll.

4. In a decorating machine the combination with a pattern roll and a work support, of a transfer roll having a core comprising a plurality of substantially rigid discs in side-to-side assembly, certain of the discs being radially shiftable relative to other discs, means to move said roll alternately into contact with work carried by said support and with said pattern roll, and means to retain said shiftable discs in a predetermined position relative to each other when the roll is in contact with the pattern roll, and to maintain said discs in a different predetermined relation one to the other when the roll is in contact with the work.

5. In a surface decorating machine having a pattern means and a work supporting means spaced from each other, the combination of a deformable transfer roll, mechanism to press the transfer roll first into contact with the pattern means and then into contact with work carried by said supporting means, said mechanism adapted and arranged to positively deform said roll when it is brought into contact with one of said means and to prevent deformation of said roll when it is in contact with the other of said means.

HOWARD F. GUNDLACH.